US012011906B2

(12) United States Patent
Castillo et al.

(10) Patent No.: US 12,011,906 B2
(45) Date of Patent: Jun. 18, 2024

(54) METHODS OF WRAPPING AN ITEM WITH A WRAPPING MATERIAL

(71) Applicant: Tama Group, Kibbutz Mishmar Ha'emek (IL)

(72) Inventors: Juan Carlos Castillo, Reservoir (AU); Jason Boyd, Acacia Ridge (AU)

(73) Assignee: Tama Group (IL)

( * ) Notice: Subject to any disclaimer, the term of this patent is extended or adjusted under 35 U.S.C. 154(b) by 610 days.

(21) Appl. No.: 17/191,875

(22) Filed: Mar. 4, 2021

(65) Prior Publication Data

US 2021/0187899 A1 Jun. 24, 2021

Related U.S. Application Data

(63) Continuation of application No. 16/372,942, filed on Apr. 2, 2019, now Pat. No. 10,960,639, which is a (Continued)

(30) Foreign Application Priority Data

Aug. 20, 2013 (AU) ................................ 2013903145
Aug. 30, 2013 (AU) ................................ 2013903304

(51) Int. Cl.
*A01F 15/07* (2006.01)
*B32B 3/26* (2006.01)
(Continued)

(52) U.S. Cl.
CPC ............ *B32B 3/266* (2013.01); *A01F 15/071* (2013.01); *B32B 7/06* (2013.01); *B32B 7/14* (2013.01);
(Continued)

(58) Field of Classification Search
CPC ........ B65B 11/04; B65B 11/56; A01F 15/071; A01F 2015/0745
(Continued)

(56) References Cited

U.S. PATENT DOCUMENTS 1,231,382 A 6/1917 Knee
2,726,222 A 12/1955 Palmquist et al.
(Continued)

FOREIGN PATENT DOCUMENTS

AU 2003292463 A1 7/2004
AU 2005300259 A1 5/2006
(Continued)

OTHER PUBLICATIONS

20180423 SA Declaration in Reply (14616711) filed on Apr. 23, 2018, pp. 1-10.
(Continued)

*Primary Examiner* — Stephen F. Gerrity
(74) *Attorney, Agent, or Firm* — Lerner David LLP

(57) ABSTRACT

The present disclosure includes various methods of wrapping an item, such as harvested agricultural material, including steps such as unrolling a wrapping material portion from a roll of wrapping material portions, the unrolling starting at a leading end of the wrapping material portion and continuing along a length of the portion towards a trailing end of the portion, each wrapping material portion including a base film, a first adhesive substrate including a bottom adhesive surface attached to a first side of the base film of the wrapping material portion adjacent to the perforation, an outwardly facing first adhesive surface covered by a first release liner with a second adhesive surface facing outwardly and attached to a second side of the base film of the wrapping material portion when on the roll, and further unrolling the wrapping material portion from the roll of
(Continued)

wrapping material portions such that the first release liner separates from the first adhesive surface, the first release liner remaining attached to the second side of the base film of the wrapping material portion and the first adhesive surface remaining attached to the first side of the base film of the wrapping material portion. Wrapping material portions may be connected to one another by perforations.

19 Claims, 7 Drawing Sheets

Related U.S. Application Data continuation of application No. 14/904,605, filed as application No. PCT/AU2014/000821 on Aug. 20, 2014, now Pat. No. 10,286,625.

(51) Int. Cl.
| B32B 7/06 | (2019.01) |
| B32B 7/14 | (2006.01) |
| B32B 25/08 | (2006.01) |
| B32B 27/08 | (2006.01) |
| B32B 37/12 | (2006.01) |
| B32B 37/14 | (2006.01) |
| B65B 11/04 | (2006.01) |
| B65D 65/14 | (2006.01) |
| B32B 7/12 | (2006.01) |

(52) U.S. Cl.
CPC ............. *B32B 25/08* (2013.01); *B32B 27/08* (2013.01); *B32B 37/12* (2013.01); *B32B 37/14* (2013.01); *B65B 11/04* (2013.01); *B65D 65/14* (2013.01); *A01F 2015/0745* (2013.01); *B32B 7/12* (2013.01); *B32B 2255/10* (2013.01); *B32B 2255/26* (2013.01); *B32B 2307/582* (2013.01); *B32B 2307/748* (2013.01); *B32B 2410/00* (2013.01); *B32B 2553/00* (2013.01); *Y10T 156/1052* (2015.01); *Y10T 156/1057* (2015.01); *Y10T 428/14* (2015.01); *Y10T 428/1476* (2015.01)

(58) Field of Classification Search
USPC .......... 53/397, 465, 580, 587, 211, 214, 216
See application file for complete search history.

(56) References Cited

U.S. PATENT DOCUMENTS

| 3,053,722 | A | | 9/1962 | Petty |
| 3,072,512 | A | | 1/1963 | Dalle |
| 3,150,029 | A | | 9/1964 | Ferrand |
| 3,162,393 | A | | 12/1964 | Gelleke |
| 3,349,765 | A | | 10/1967 | Blanford |
| 3,369,766 | A | | 2/1968 | Herman |
| 3,457,919 | A | | 7/1969 | Harbard |
| 3,494,095 | A | * | 2/1970 | Valvano ................. B65B 11/04 53/465 |
| 3,735,865 | A | | 5/1973 | Smith |
| 3,746,607 | A | | 7/1973 | Harmon et al. |
| 3,942,713 | A | | 3/1976 | Olson et al. |
| 4,041,201 | A | | 8/1977 | Wurker |
| 4,050,121 | A | | 9/1977 | Richman |
| 4,127,132 | A | | 11/1978 | Karami |
| 4,201,352 | A | | 5/1980 | Madachy |
| 4,258,846 | A | | 3/1981 | Campo |
| 4,338,084 | A | | 7/1982 | Berthelseh |
| 4,343,132 | A | | 8/1982 | Lawless, Jr. |
| 4,349,163 | A | | 9/1982 | Wise |
| 4,416,392 | A | | 11/1983 | Smith |
| 4,546,875 | A | * | 10/1985 | Zweber ................. B65D 65/14 53/465 |
| 4,605,577 | A | | 8/1986 | Bowytz |
| 4,688,368 | A | | 8/1987 | Honegger |
| 4,768,810 | A | | 9/1988 | Mertens |
| 4,778,701 | A | | 10/1988 | Pape et al. |
| 4,801,480 | A | | 1/1989 | Panza et al. |
| 4,917,928 | A | | 4/1990 | Heinecke |
| 4,941,882 | A | | 7/1990 | Ward et al. |
| 4,996,822 | A | * | 3/1991 | Truppe ................. B65B 11/56 53/216 |
| 5,057,097 | A | | 10/1991 | Gesp |
| 5,080,254 | A | | 1/1992 | Feer |
| 5,221,393 | A | | 6/1993 | Heutschi |
| 5,234,517 | A | | 8/1993 | Pape et al. |
| 5,324,078 | A | | 6/1994 | Bane |
| 5,365,836 | A | | 11/1994 | Campbell |
| 5,413,656 | A | | 5/1995 | Kuhnhold et al. |
| 5,496,605 | A | | 3/1996 | Augst et al. |
| 5,497,903 | A | | 3/1996 | Yoneyama |
| 5,520,308 | A | | 5/1996 | Berg, Jr. et al. |
| 5,591,521 | A | | 1/1997 | Arakawa et al. |
| 5,623,812 | A | | 4/1997 | Todt |
| 5,646,090 | A | | 7/1997 | Tamura et al. |
| 5,660,349 | A | | 8/1997 | Miller et al. |
| 5,747,131 | A | * | 5/1998 | Kreckel ................. C09J 7/243 53/580 |
| 5,749,466 | A | | 5/1998 | Seki |
| 5,885,679 | A | | 3/1999 | Yasue et al. |
| 5,979,141 | A | | 11/1999 | Phillips |
| 5,979,450 | A | | 11/1999 | Baker et al. |
| 6,008,429 | A | | 12/1999 | Ritger |
| 6,153,278 | A | | 11/2000 | Timmerman et al. |
| 6,263,650 | B1 | | 7/2001 | Deutsch et al. |
| 6,295,758 | B1 | | 10/2001 | Weder et al. |
| 6,365,254 | B1 | | 4/2002 | Zoller et al. |
| 6,383,430 | B1 | | 5/2002 | Johnstone |
| 6,453,805 | B1 | | 9/2002 | Viaud et al. |
| 6,467,719 | B1 | | 10/2002 | Rodriguez |
| 6,514,585 | B1 | | 2/2003 | Pearson et al. |
| 6,550,633 | B2 | | 4/2003 | Huang et al. |
| 6,550,634 | B1 | | 4/2003 | Alegre De Miquel et al. |
| 6,632,311 | B1 | | 10/2003 | Glenna et al. |
| 6,637,697 | B1 | | 10/2003 | Wienberg |
| 6,644,498 | B1 | | 11/2003 | Lemberger et al. |
| 6,663,932 | B2 | | 12/2003 | Mclaughlin et al. |
| 6,685,050 | B2 | | 2/2004 | Schmidt et al. |
| 6,756,096 | B2 | | 6/2004 | Harding |
| 6,787,209 | B2 | | 9/2004 | Mass et al. |
| 6,901,723 | B2 | | 6/2005 | Jordan et al. |
| 6,971,542 | B2 | | 12/2005 | Vogel et al. |
| 7,165,928 | B2 | | 1/2007 | Haverdink et al. |
| 7,541,080 | B2 | | 6/2009 | Mass et al. |
| 7,625,332 | B2 | | 12/2009 | Mass et al. |
| 7,636,987 | B2 | | 12/2009 | Derscheid et al. |
| 7,694,491 | B2 | | 4/2010 | Noonan et al. |
| 8,071,196 | B2 | | 12/2011 | Goering |
| 8,709,565 | B2 | | 4/2014 | Kalwara et al. |
| 10,239,278 | B2 | | 3/2019 | Castillo et al. |
| 10,257,986 | B1 | | 4/2019 | Porter et al. |
| 10,286,625 | B2 | | 5/2019 | Castillo et al. |
| 2001/0003617 | A1 | | 6/2001 | Storbeck et al. |
| 2002/0172792 | A1 | | 11/2002 | Jarvis et al. |
| 2002/0182367 | A1 | | 12/2002 | Salzsauler et al. |
| 2002/0192406 | A1 | * | 12/2002 | Labbe et al. .......... B65B 25/148 53/465 |
| 2003/0000934 | A1 | | 1/2003 | Tanaka et al. |
| 2003/0059566 | A1 | * | 3/2003 | Chien ................. C09J 7/20 428/43 |
| 2003/0115835 | A1 | * | 6/2003 | Kadota et al. ........ B65B 25/148 53/465 |
| 2004/0121103 | A1 | | 6/2004 | Mass et al. |
| 2004/0121108 | A1 | | 6/2004 | Mass et al. |
| 2004/0151853 | A1 | | 8/2004 | Shirrell et al. |
| 2005/0034429 | A1 | | 2/2005 | Mass et al. |
| 2005/0153083 | A1 | | 7/2005 | Huang |
| 2005/0155714 | A1 | | 7/2005 | Adams |
| 2006/0101624 | A1 | | 5/2006 | Derscheid et al. |
| 2007/0152010 | A1 | | 7/2007 | Denen et al. |

(56) References Cited

U.S. PATENT DOCUMENTS

| | | |
|---|---|---|
| 2007/0240389 A1 | 10/2007 | Frerichs |
| 2008/0245923 A1 | 10/2008 | Maddaleni et al. |
| 2009/0107349 A1 | 4/2009 | Noonan et al. |
| 2009/0226657 A1 | 9/2009 | Thiele |
| 2009/0274881 A1 | 11/2009 | Mass |
| 2009/0302147 A1 | 12/2009 | Emoto |
| 2010/0237179 A1 | 9/2010 | De Matteis |
| 2011/0133015 A1 | 6/2011 | Gelli et al. |
| 2011/0309544 A1 | 12/2011 | Hupp et al. |
| 2011/0311749 A1 | 12/2011 | McNeil |
| 2012/0148783 A1 | 6/2012 | Kunkleman |
| 2013/0143001 A1 | 6/2013 | Manifold et al. |
| 2013/0221078 A1 | 8/2013 | Skelton |
| 2013/0248643 A1 | 9/2013 | Newhouse et al. |
| 2013/0320124 A1 | 12/2013 | Rochon et al. |
| 2014/0263590 A1 | 9/2014 | Skelton |
| 2014/0352263 A1 | 12/2014 | Harchol et al. |
| 2015/0367611 A1* | 12/2015 | Rimon ............... B65B 51/02 156/60 |
| 2016/0151994 A1 | 6/2016 | Castillo |
| 2016/0177135 A1 | 6/2016 | Allen |

FOREIGN PATENT DOCUMENTS

| | | | |
|---|---|---|---|
| AU | 2008229852 A1 | 5/2009 | |
| AU | 2013902776 | 7/2013 | |
| AU | 2008355557 B2 | 9/2013 | |
| AU | 2014308544 B2 | 2/2017 | |
| CN | 1069281 C | 8/2001 | |
| CN | 1692062 A | 11/2005 | |
| EP | 0942055 A1 | 9/1999 | |
| EP | 1584574 A2 | 10/2005 | |
| GB | 2221841 A * | 2/1990 | ........... A01F 15/071 |
| GB | 2233962 A | 1/1991 | |
| GB | 2348633 A | 10/2000 | |
| JP | H0958743 A * | 3/1997 | |
| JP | 2001019919 A | 1/2001 | |
| JP | 2003160164 A * | 6/2003 | ............... C09J 7/21 |
| JP | 2010132826 A * | 6/2010 | |
| WO | 9813636 A2 | 4/1998 | |
| WO | 9938930 A1 | 8/1999 | |
| WO | 0061359 A3 | 2/2001 | |
| WO | 0170497 A2 | 9/2001 | |
| WO | 2004031049 A1 | 4/2004 | |
| WO | 2015010151 A1 | 1/2015 | |

OTHER PUBLICATIONS

Australian Examinarion Report for Application No. 2014308544 dated May 2, 2016, 1 page.
Australian Examination Report for Application No. 2017203044 dated Jul. 30, 2018, 1 page.
Brazilian Search Report including Written Opinion for Application No. BR112016003370-1, dated Jul. 19, 2019, pp. 1-4.
Chinese Search Report for Application No. 2013800798640 dated Mar. 15, 2018, 2 pages.
Chinese Search Report for Application No. 201480039097.5 dated May 31, 2017, 2 pages.
Confidentiality Agreement Between Dominion Tapes Pty Ltd. and Integrated Packaging Group Pty Ltd. dated Apr. 18, 2013, pp. 1-8.
Corporate Notebook Extract made public as of the date of filing of the Statement of Grounds and Particulars (Aug. 23, 2017), p. 1.
European Search Report for Application No. EP13889998 dated May 31, 2017, 1 page.
International Search Report and Written Opinion for Application No. PCT/AU2014/000821 dated Sep. 26, 2014.
P113709AUM—Evidence in Answer (14337889), dated Feb. 19, 2018, pp. 1-95.
Porter, et al., U.S. Appl. No. 14/667,574, filed Mar. 24, 2015, titled "Wrapping Materials for Solid Objects".
Statement of Grounds and Particulars filed Aug. 23, 2017, pp. 1-5.
The United States Patent and Trademark Office: The International Search Report and Written Opinion of the International Searching Authority, or the Declaration; International Search Report and Written Opinion for PCT/US2015/022330; dated Jun. 18, 2015, The United States Patent and Trademark Office; U.S, 1 page.
The United States Patent and Trademark Office; The International Search Report and the Written Opinion of the International Searching Authority, or the Declaration; PCT/US17/53748 Search Report; dated Feb. 9, 2018; United States PatentOffice; US, 1 page.

* cited by examiner

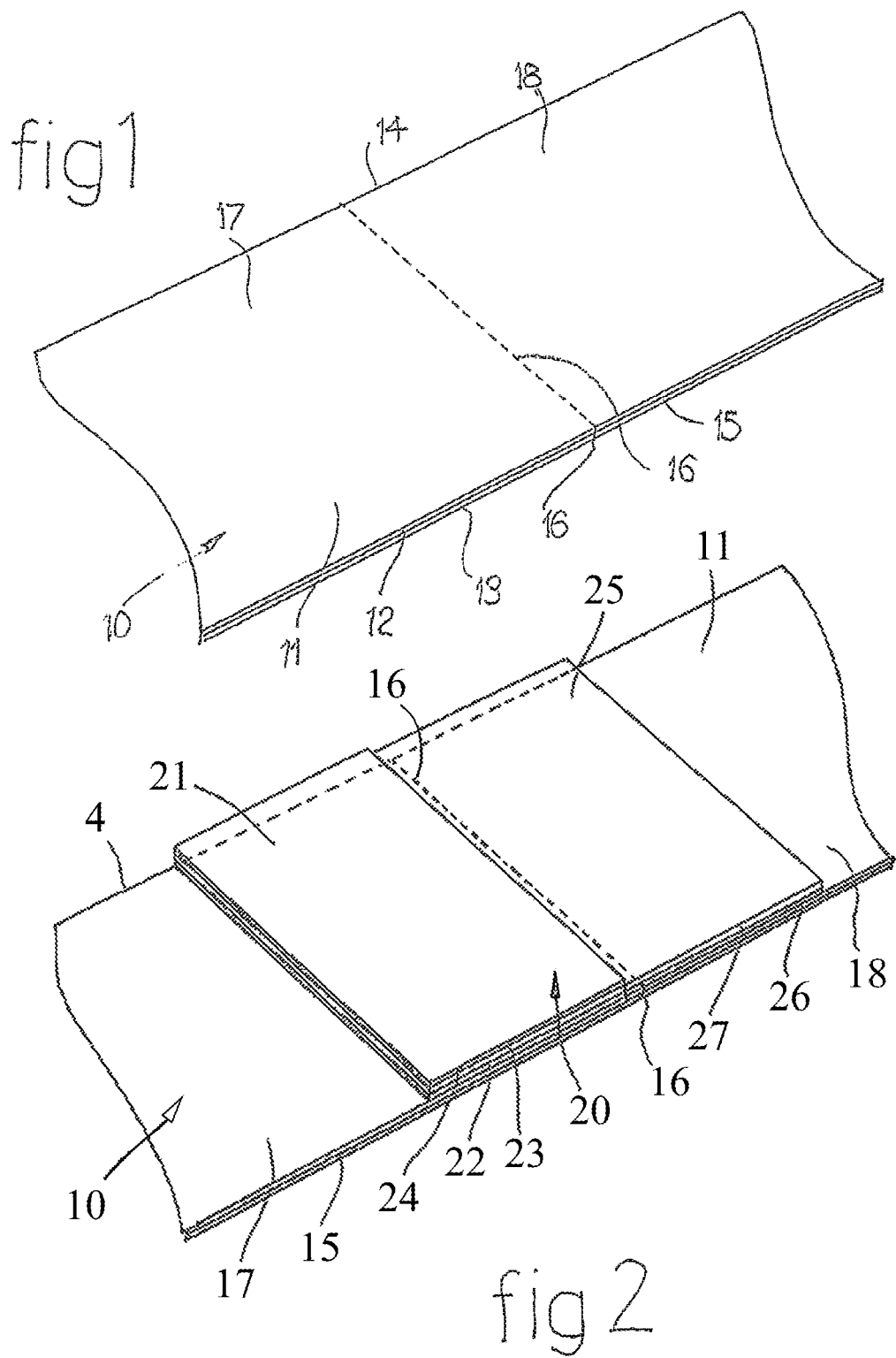

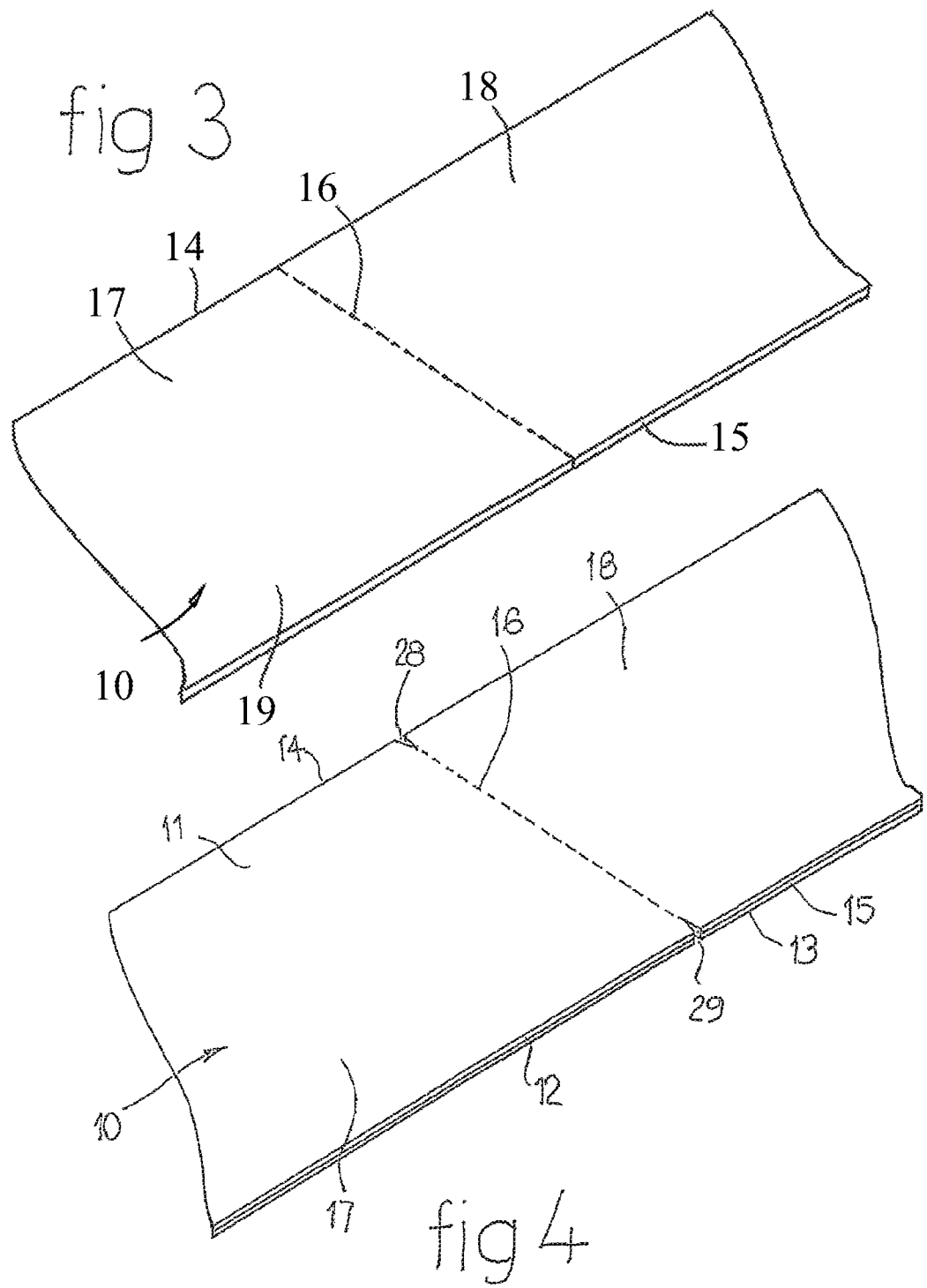

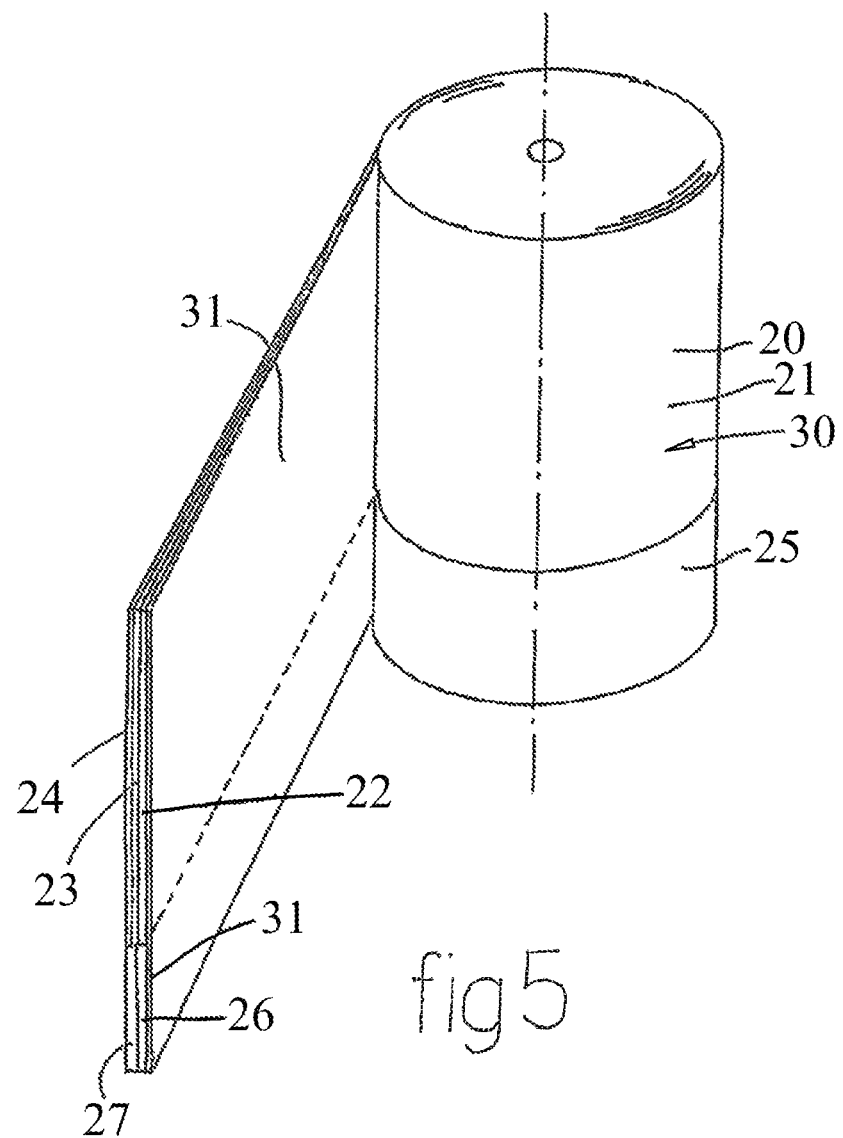

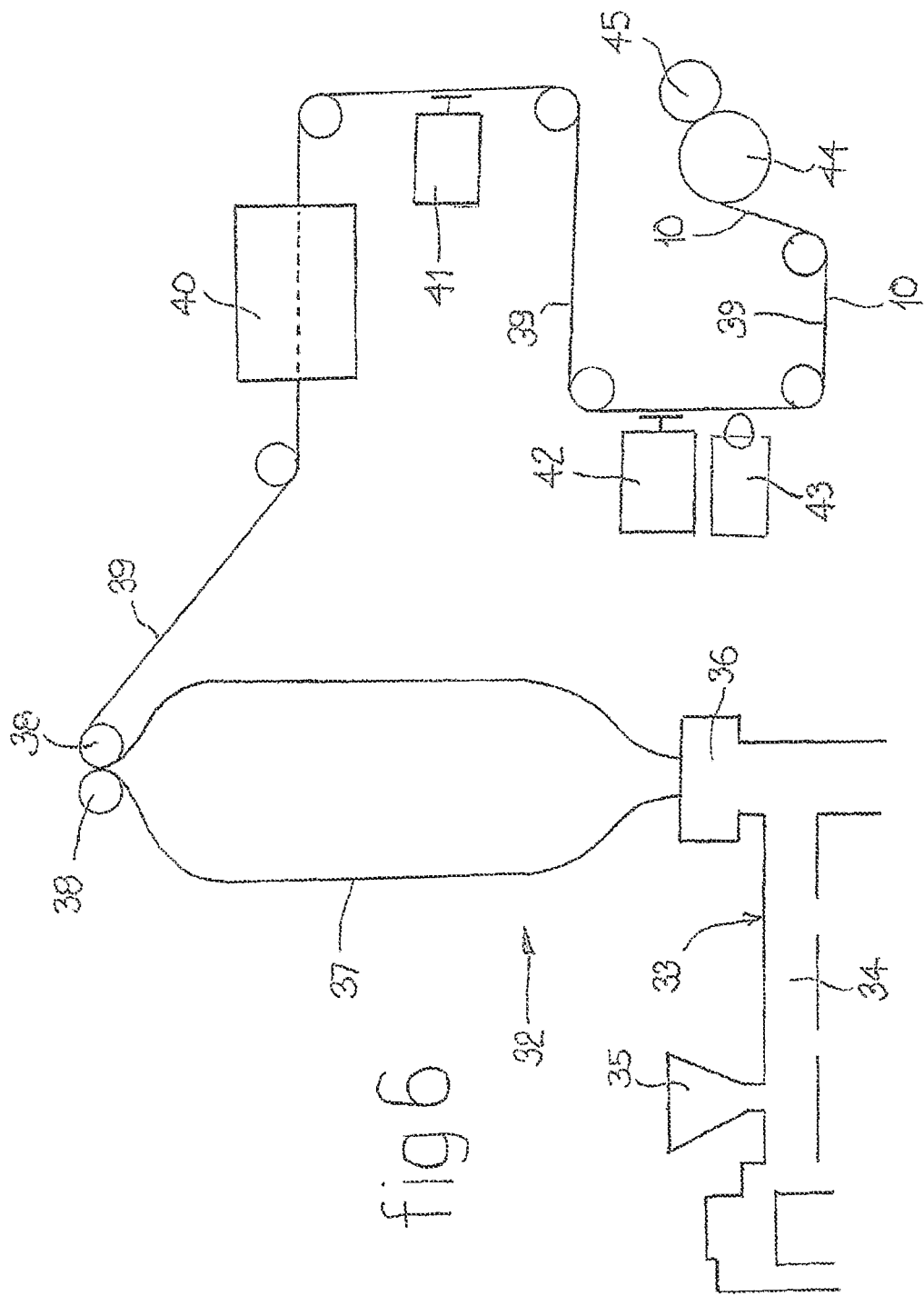

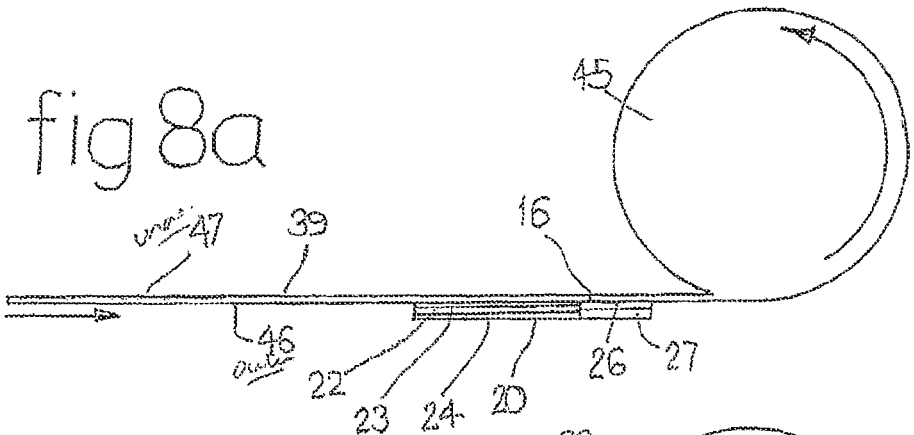
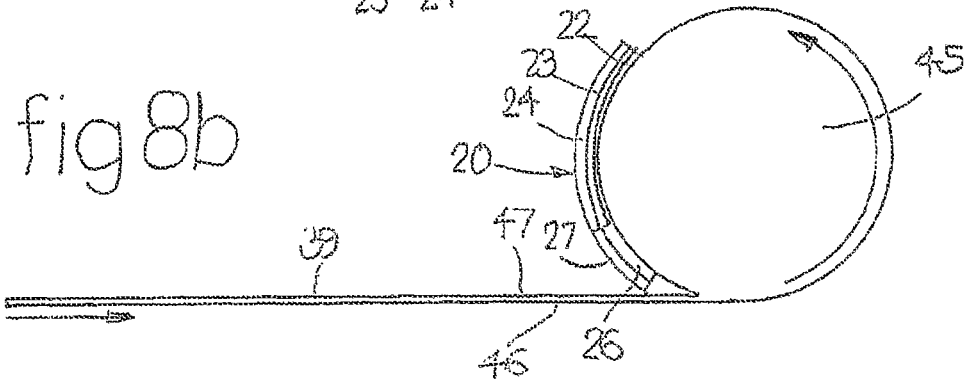
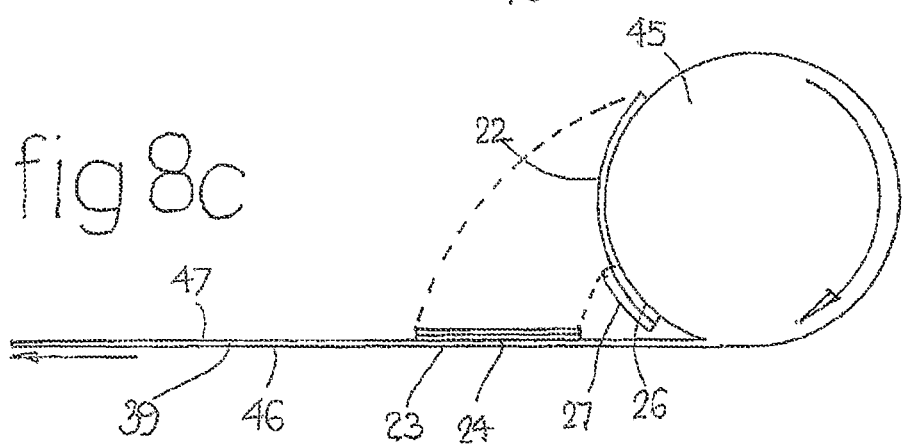
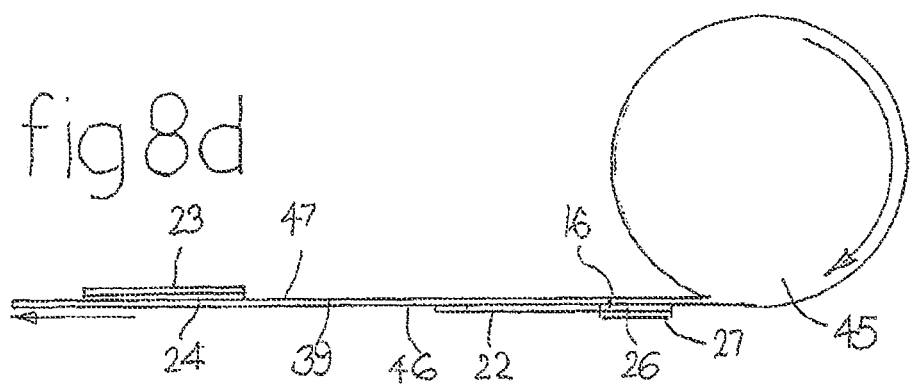

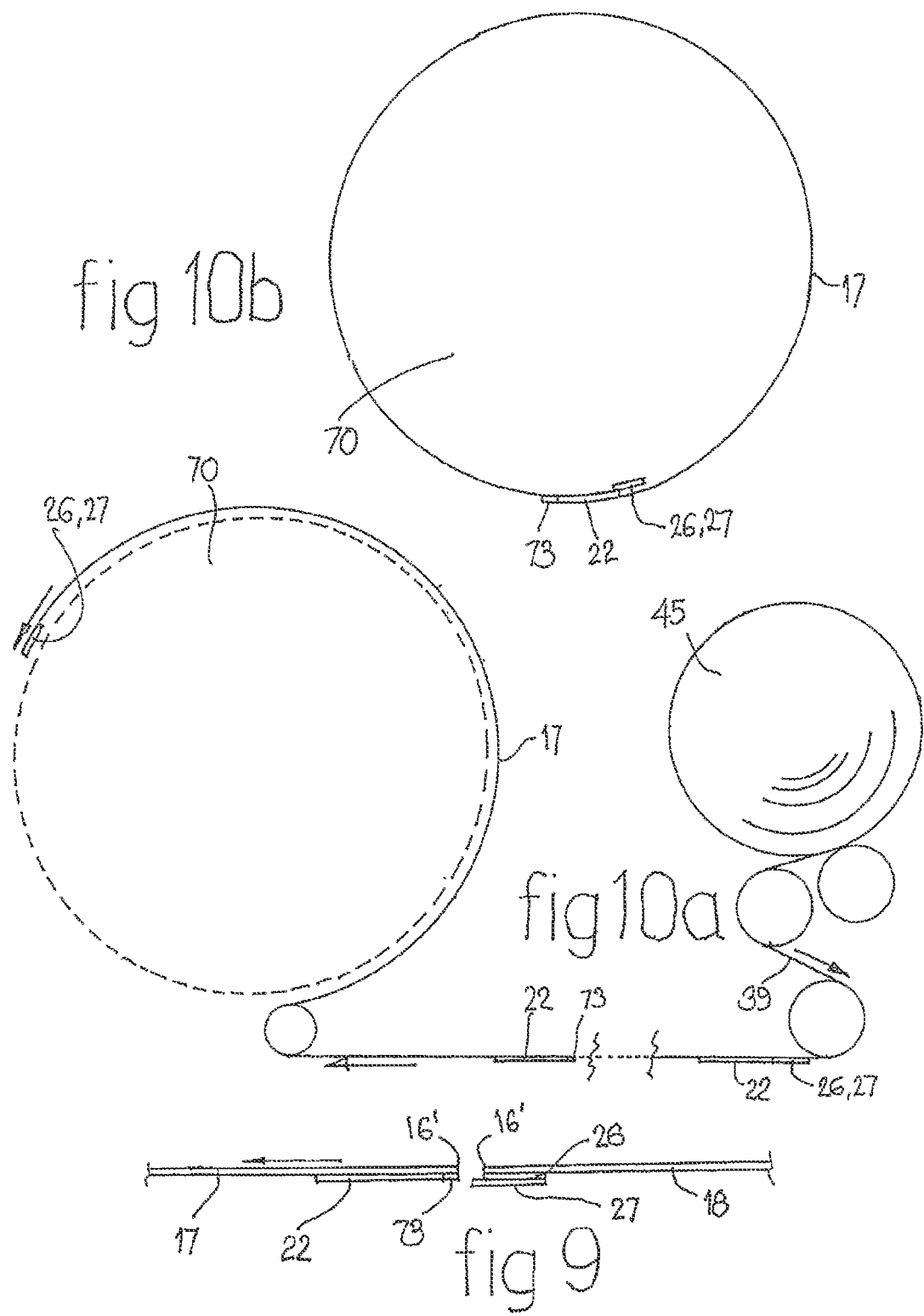

METHODS OF WRAPPING AN ITEM WITH A WRAPPING MATERIAL

CROSS-REFERENCE TO RELATED APPLICATIONS

This application is a continuation of U.S. patent application Ser. No. 16/372,942, filed Apr. 2, 2019, which issued as U.S. Pat. No. 10,960,639, which is a continuation of U.S. application Ser. No. 14/904,605, filed on Jan. 12, 2016, which issued as U.S. Pat. No. 10,286,635, which is a national phase entry under 35 U.S.C. § 371 of International Application No. PCT/AU2014/000821, filed on Aug. 20, 2014, published in English, which claims priority from Australian Provisional Application No. 2013903304, filed on Aug. 30, 2013, and which claims priority from Australian Provisional Application No. 2013903145, filed on Aug. 20, 2013, the disclosures of which are incorporated herein by reference.

FIELD OF THE INVENTION

The present invention relates to improvements in wrapping materials and methods of manufacture of same for wrapping of any material formed into bales, including but not limited to, harvested agricultural materials.

BACKGROUND TO THE INVENTION

It is known to form bales of harvested agricultural material, such as hay, silage making materials, cotton and the like, and to wrap same in plastic film web for storage and/or transport. It is also known to form bales of collected rubbish or waste materials and to wrap such bales in a plastic film web. One technique is to secure the formed bale initially with a net material and then to wrap same with plastics film web. A second technique is to wrap the formed bale in multiple overlapping layers of a plastic film web. Typically in such techniques the plastic film web is made from linear low density polyethylene that is made to be self adhesive to adhere to itself. In yet another technique, a single individual length of a plastic film web is used with an applied adhesive strip of sufficient strength to adhere and hold a wrapped bale. Such a technique is described in Australian patent specification nos. 2003292463 and 2005300259 which provide individual and separate lengths of plastic material web formed into a connected roll, each individual length being sufficient to wrap once around a desired bale size. Each individual and separate length is held to an adjacent length by a Z lock fold configuration at its ends and adhesive to form a temporarily continuous roll which in use in a suitable baler is separated from the roll by an applied force of sufficient strength to be then wrapped around and secured to a formed bale. A bale forming machine capable of using this type of wrapping material is disclosed in Australian patent specification no. 2008229852 and U.S. Pat. No. 6,263,650.

There is a need to provide an improved wrapping material for wrapping any material formed into a bale, but particularly for harvested agricultural material formed into a bale with substantially one pass of a plastics material film web having a predefined length. There is also a need to provide a method of manufacturing such a wrapping material in a continuous roll whereby each of the predefined lengths of the plastics material film web are formed in a continuous length of adjoining portions that are separable sequentially in a baling machine.

OBJECT OF THE INVENTION

It is an object of the present invention to substantially overcome or at least ameliorate one or more of the disadvantages of the prior art, or to at least provide a useful alternative.

SUMMARY OF THE INVENTION

According to a first aspect, the present invention provides a wrapping material, said wrapping material including at least one layer of a flexible plastic material film web having a substantially uniform width and divided lengthwise into portions of substantially equal length by a plurality of spaced lines of perforations extending fully transversely across the width of the wrapping material and fully through the layer or layers forming the wrapping material, each said line of perforations having a first adhesive substrate adhered to a first surface of said wrapping material adjacent to but spaced from the line of perforations, said first adhesive substrate extending substantially across the width of said wrapping material and having, in use, an outwardly facing adhesive surface, and a second adhesive substrate extending substantially across the width of said wrapping material and being adhesively secured to said first surface of the wrapping material whereby the second adhesive substrate overlies said line of perforations.

In accordance with a second aspect, the present invention provides a method of manufacturing a roll of wrapping material for wrapping formed bales with an individual portion of said wrapping material, said method including providing a base web of a flexible plastic material film having at least one layer; forming a plurality of substantially evenly spaced lines of perforations extending fully transversely across and fully through said base web; applying a first adhesive substrate to a first surface of said base web adjacent to but spaced from each said line of perforations, said first adhesive substrate having an outwardly facing first adhesive surface covered by a first release liner with a second adhesive surface facing outwardly; applying a second adhesive substrate to said first surface of said base web adjacent to said first adhesive substrate and overlying said line of perforations, said second adhesive substrate having a second release liner covering an outwardly facing adhesive surface of said second adhesive substrate; and rolling said base web into a said roll whereby the second adhesive surface of said first release liner adheres to a second surface of said base web.

In accordance with yet another aspect of this invention there is provided a wrapping material portion for wrapping a formed bale of material, said wrapping material portion having a base web of a flexible plastic material film having at least one layer, a leading end of said base web having a first adhesive substrate secured to a first surface of the base web and extending substantially across the width of said base web, and a second adhesive substrate adhered to said first surface at a trailing end of said material portion, said second adhesive substrate having an outwardly facing adhesive surface.

Further preferred features and aspects will become apparent from the following description of preferred embodiments given in relation to the annexed drawings.

BRIEF DESCRIPTION OF THE DRAWINGS

FIG. 1 is a partial schematic perspective view of a base plastic material film web usable in the present invention.

FIG. 2 is a view similar to FIG. 1 with adhesive strip materials applied to the base plastic material film web to form a wrapping material in accordance with the present invention;

FIG. 3 is a view similar to FIG. 1 showing a further possible form of the base plastic material film web;

FIG. 4 is a view similar to FIG. 1 showing a further possible modification to the base plastic material film web in accordance with the present invention;

FIG. 5 shows a roll of adhesive material strip usable to form the wrapping material of FIG. 2;

FIG. 6 shows schematically, preferred methods of manufacturing the wrapping material according to the present invention;

FIGS. 8a, 8b, 8c and 8d illustrate stages in the rolling up a wrapping material produced according to the method described in relation to FIG. 6 and in the unrolling of this wrapping material in use in a baling machine;

FIG. 9 illustrates schematically in edge elevation view, the point at which separation occurs between portions of the wrapping material;

FIG. 10a illustrates a portion of the wrapping material being fed into a baler chamber; and FIG. 10b illustrates the portion of the wrapping material wrapped about a formed bale.

DESCRIPTION OF PREFERRED EMBODIMENT

Figure 7:
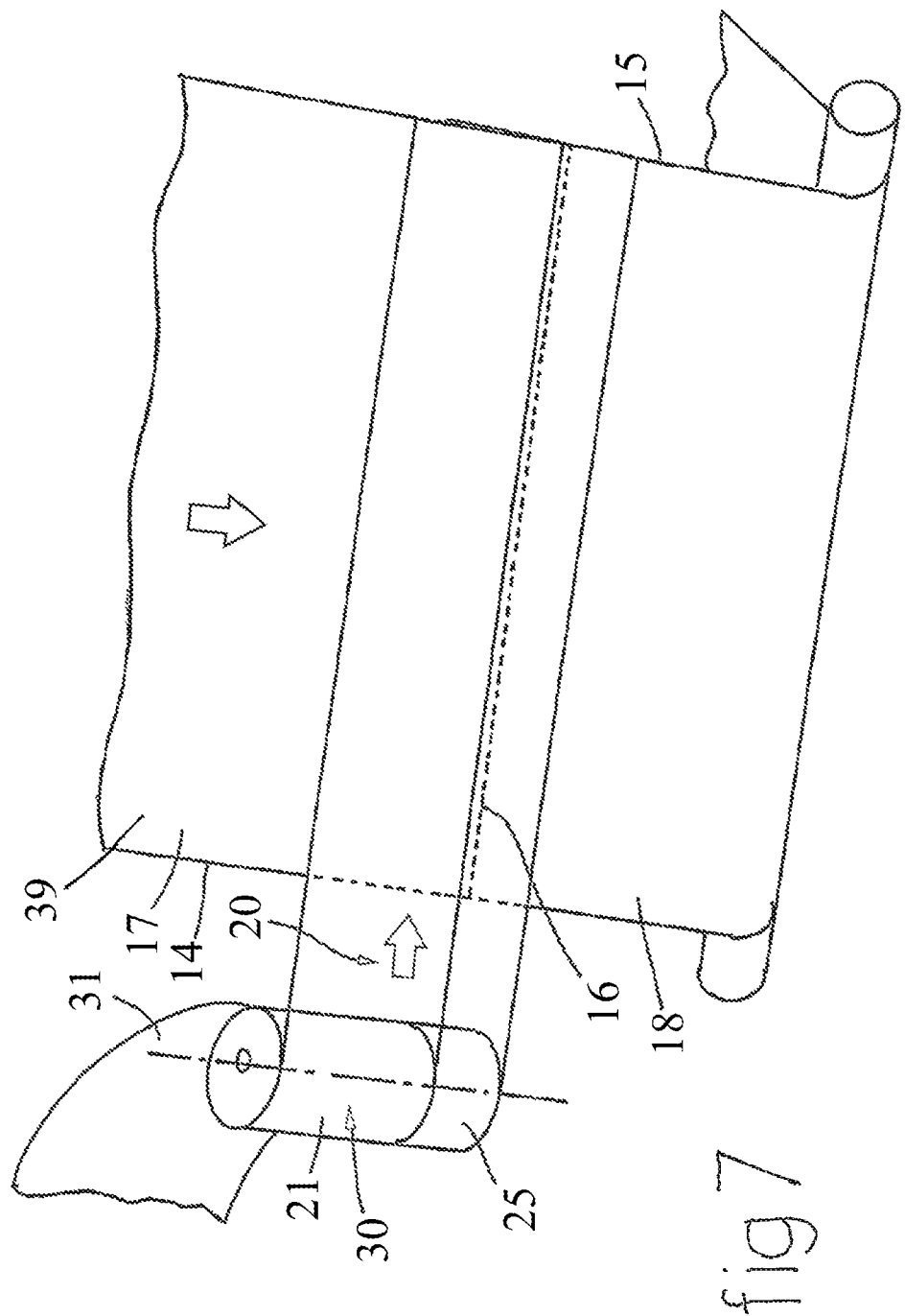
FIG. 7 is a schematic perspective view of one stage in the manufacturing process represented in FIG. 1.

Referring to FIGS. 1 and 2, the wrapping material 10 may include a base plastic material film web 11 formed by two layers 12, 13 adhered to one another. The web 11 has a uniform width with side edges 14, 15 and uniformly spaced lines of perforations 16 extending fully across and through the web 11 to define individual length portions 17, 18 of equal length along the web 11. In a roll of the wrapping material, multiple portions 17, 18 are provided with the portion 17 being closer to a free end of the roll. The plastic material film of the web 11 may include any thermoplastic membrane which may include master batches and Polyisobutylene (PIB) as an adhesive including linear low density polyethylene or any other polyolefin. Other plastics materials could also be used. The web thickness may be 75 mm made up nominally of two layers of equal thickness (37.5 mm). FIG. 3 illustrates an alternative base plastic material film web 19 made of a single thickness web but otherwise has the same features as the base web of FIG. 1. FIG. 4 illustrates a further possible arrangement where the lateral edge regions of perforation line 16 are fully severed through the base plastic material film web 11, 19 at 28, 29 by a short distance (5 to 10 mm) to assist with initiation of separation in use of the wrapping material 10. Conveniently, the wrapping material is made up into rolls 45 for use in a bale wrapping machine where the individual length portions can be sequentially removed from the roll to be wrapped around a formed bale. A base wrapping material generally according to FIGS. 1 and 2 can form a roll 45 of at least 24 portions 17, 18 although this may vary depending on the thickness of the base wrap material 11.

FIG. 2 illustrates the layers of adhesive material strips 20 applied over each zone surrounding the spaced perforation lines 16 along the base plastic material film web 11, 19. The layers 20 comprise a first strip section 21 having a rubber based adhesive (AFT404) substrate 22 covered by a release liner 23 and a tissue based acrylic adhesive layer (AFTDS18) 24. The rubber based adhesive is of advantage in that it does not stick or adhere to rubber rollers in a baling machine. The first strip section 21 is applied to the base plastic material film web 11, 19 such that preferably a short distance is provided between the perforation line 16 and the adjacent edge of the adhesive substrate 22. The short distance might be of the order of 10-15 mm, preferably 5 to 10 mm. The layers 20 include a second strip section 25 comprised of a tissue based adhesive acrylic based adhesive (AFTDS18) separation layer 26 adhered to the base plastic material film web 11, 19 and a covering release liner 27. Conveniently the second strip section 25 abuts the first strip section 21 such that the tissue based adhesive and separation layer 26 overlies the perforation line 16. Although the drawings illustrate the tissue based adhesive layer 26 abutting the double sided adhesive tape on a rubber based substrate 22, it is possible for the layer 26 to overlay the substrate 22.

FIG. 5 illustrates a roll 30 of adhesive material strips 20 supported on a release liner layer 31 such that the strips 20 can be formed into a roll ready for application in a wrapping material manufacturing technique as illustrated in FIGS. 6 and 7. In one preferred construction, the first strip section 21 may have a width of 200 to 333 mm, preferably about 250 mm. The second strip section 25 may have a width of 75 to 150 mm, preferably about 100 mm, although other dimensions are possible.

The acrylic based tissue adhesive (AFTDS18) used for layers 26 and 24 has a tear strength that is substantially equal in all directions. The adhesive layer 26, in overlying the perforation lines 16 increases the strength of the perforation lines from approximately 20 newtons to about 55 newtons such that the web holds together for handling purposes as a continuous web in a baling machine (or similar) until such time as it is desired to remove a web portion from the roll for wrapping about a formed bale. The rubber based adhesive substrate 22 has adhesive effect on both faces and has a tear strength that is greater in the longitudinal direction of the base web material 11, 19 than on the transverse direction when the substrate 22 is applied to the base web material 11, 19. Moreover, the tear strength in the longitudinal direction is greater than that of the adhesive layer 26.

FIG. 6 illustrates schematically some possible methods of manufacturing a wrapping material 10 in accordance with the present invention. As illustrated, the manufacturing apparatus 32 may include a bubble film production machine 33 including a resin extruder 34, a raw material feed hopper 35 and a die and air ring 36 for forming an air inflated film bubble or tube 37 of conventional form. The film bubble may be a mono layer plastics material or a multi layered co-extruded structure including two, three or more layers coextruded structures. In the latter case, the inner surface of the plastics material film bubble may contain PIB (polyisobutylene) to aid with the adherence of the layers together when flattened. The film bubble 37 is passed through nip rollers 38 to press the film together forming a flattened film of two adhered layers 39 with a normal width slightly greater than that of the required wrapping material. The two adhered layers 39 also having a nominal thickness equivalent to the thickness of the desired wrapping material. Of course, if the extruder produces multiple layers then each of the two layers will have further internally different layer structures. The layers 39 are then passed to a perforating machine 40 to form a full width line of perforations 16 (FIGS. 1 to 5) fully across the width of the layers 39 and fully through the layers 39. Rather than using blown film, it is also possible to use cast film and laminated cast film if desired. The perforation lines 16 are formed at evenly spaced intervals whereby the length of the material layers 39 between the perforation lines is equivalent to one wrap material length for a desired bale size. The wrap material base layers 39 (FIGS. 1, 4) might then be formed into rolls for subsequent processing as illustrated, or continued processing in line could occur as described hereafter. The apparatus 32 might include an optional labelling devices 41, such as an RFID labeler, for applying indicative labels (as desired) to the base layers of the wrap material 39. If used, the labelling device 41 might be provided at any stage in the production process, post formation of the perforation lines 16. Moreover in an automatic baling machine, the film web exiting the roll 45 will be braked by any suitable means whereby continued movement of the foremost portion 17 will cause sufficient separation forces on the perforation line 16 to initiate separation of the portion 17 from the remainder of the connected portions on the roll 45. The labelling device 41 may then apply an indicative marker or label to the base web material to initiate braking of the web material in a baling machine.

The apparatus 32 may further include a tape application station 42 for applying an adhesive tape strip 20 to the region of each perforation line 16 (FIG. 7). In this embodiment, the backing release line 31 is removed from the strips 20 and the adhesive strips are laid fully across an outer surface 46 (in use) of the base film web material 39 with the second strip section 25 overlying the perforation line 16. The strips 20 are separated from the roll 30 adjacent the near edge of the base material film web 39 and thereafter an edge trimming device 43 trims the edges 14, 15 of the base material web 39 including, if needed, ends of the strips 20 such that the then formed wrapping material10 has the required width. The wrapping material 10 then passes over a driven lay-on roller 44 to be rolled up as a roll 45 ready for use in a baler.

FIGS. 8a and 8b illustrate the adhesive strips 20 applied to the outer surface 46 as the roll 45 is formed such that the adhesive strips 20 are sandwiched between two portions of the base material film web 39 with adhesive layers 22, 26 adhered to the outer surface 46 and the adhesive layer 24 adhered to an opposed surface 47 of the base material film web 39. FIGS. 8c and 8d illustrate schematically, the adhesive strips 20 as the roll 45 is rolled out in use in a baler. As shown in FIG. 8c, the release liner 23 and adhesive layer 24 detach from the substrate adhesive layer 22 and remain adhered to the other surface 47 of the base film web material 39. The remainder of the strips 20, namely the substrate adhesive layer 22 and the adhesive layer 26 and release liner 27 remain adhered to the outer surface 46 of the base film web material 39. The adhesive substrate layer 22 is adhered adjacent to a perforation line 16 at a trailing end of a forward portion length 17 of the base film web material 39 with the adhesive strip 26 and release liner 27 adhered to a leading end of a following portion length 18 of the base film web material 39.

As shown in FIG. 9, the lead or forward portion is, in use, carried forward by the baler with the following portion length 18 braked with the remainder of the roll 45. At a predetermined force loading, the portions separate at the perforation line 16. Separation initiates on the highest elongation point on the outermost edges 14, 15 of the base film web 11, 19 where it incrementally creates a separation angle great enough to initiate the activation of the perforations of line 16 at the required angle as opposed to a straight linear direction break. At the point of separation the tissue based adhesive layer 26 has a stronger bond to the film layer than the release liner and transfers across to provide an adhesive strip 73 to cover the gap between the edge of the perforation point and the nominal distance to the rubber based substrate adhesive layer 22 set back from the perforation line 16. The perforation once activated by the separation of the adhesive tissue layer 26, creates a secondary process which allows the tape to tear along the perforation separation point creating a substantially clean edge 16' with fine film tails created by normal mechanical working of a perforation.

As shown in FIGS. 10a, 10b the separated film portion 17 is fed into the baler chamber with the adhesive layer 26 and release layer 27 on the lead edge stiffening and assisting feeding of the web into the chamber about a bale 70. The film portion 17 passes around a roller 71 along a feed path 72 and around the bale 70 with the trailing edge zone carrying the rubber based adhesive substrate 22 being pressed to the lead edge zone to complete the wrapping process (FIG. 10b). The adhesive strip 73 and the adhesive substrate 22 ensures that the tail end of the film web portion 17 has no regions likely to lift and break the seal of the wrapping.

The invention claimed is:

1. A method of wrapping an item, comprising the steps of:
unrolling a wrapping material portion from a roll of wrapping material portions, the unrolling starting at a leading end of the wrapping material portion and continuing along a length of the portion towards a trailing end of the portion to initiate wrapping of the item, wherein, except for on the last wrapping material portion on the roll, the trailing end of each wrapping material portion on the roll of wrapping material portions connected to the leading end of a subsequent wrapping material portion by a perforation line, and each wrapping material portion including a base film and, except for on the last wrapping material portion on the roll, an adhesive substrate including a bottom adhesive surface attached to a first side of the base film and attached to a first side of the base film of the subsequent wrapping material portion, such that the adhesive substrate overlies the perforation line, and a top adhesive surface, facing opposite of the bottom adhesive surface and the top first adhesive surface is covered by a first release liner;
further unrolling the wrapping material portion from the roll of wrapping material portions until at least the perforation line and adhesive substrate of the wrapping material portion unrolls from the roll, and wherein the adhesive substrate and first release liner remains attached to the first side of the base film of the wrapping material portion and remains attached to the first side of the base film of the subsequent wrapping material portion;
stopping the roll while the item continues to pull on the wrapping material portion; and
separating the wrapping material portion from the subsequent wrapping material portion by separating the wrapping material portion at the perforation line and through the adhesive substrate.

2. The method of claim 1, wherein during the separating step, a portion of the adhesive substrate remains attached to the first side of the base film of the wrapping material portion and a another portion of the adhesive substrate remains attached to the first side of the base film of the subsequent wrapping material portion.

3. The method of claim 2, wherein during the separating step, the first release liner separates from the portion of the adhesive substrate remaining attached to the first side of the base film of the wrapping material portion to expose the portion of the adhesive substrate remaining attached to the first side of the base film of the wrapping material portion.

4. The method of claim 3, wherein each wrapping material portion includes a second adhesive substrate including a bottom adhesive surface attached to the first side of the base film adjacent to the portion of the adhesive substrate remaining attached to the first side of the base film of the wrapping material portion, a top second adhesive surface facing opposite of the bottom adhesive surface and the top adhesive surface is covered by a second release liner with a top third adhesive surface facing away from the top second adhesive surface and attached to a second side of the base film when on the roll, wherein during the further unrolling step, the second release liner is separated from the second adhesive substrate to expose the second adhesive substrate.

5. The method of claim 4, further comprising the step of sealing the wrapping material portion around the item by attaching the second adhesive substrate and the portion of the adhesive substrate remaining attached to the first side of the base film of the wrapping material portion to the second side of the base film.

6. The method of claim 3, wherein the first release liner remains covering the another portion of the adhesive substrate remaining attached to the first side of the base film of the subsequent wrapping material portion.

7. The method of claim 1, wherein the item is a bale of harvested agricultural material.

8. The method of claim 1, wherein each wrapping material portion includes a second adhesive substrate including a bottom adhesive surface attached to the first side of the base film adjacent to the perforation line and adjacent to the adhesive substrate, a top second adhesive surface facing opposite of the bottom adhesive surface and the top adhesive surface is covered by a second release liner with a top third adhesive surface facing away from the top second adhesive surface and attached to a second side of the base film when on the roll, wherein during the further unrolling step, the second release liner is separated from the second adhesive substrate and remains adhered to the second side of the base film of the wrapping material portion.

9. The method of claim 8, wherein during the further unrolling step, the second release liner separating from the second adhesive substrate exposes the second adhesive substrate.

10. The method of claim 9, further comprising the step of sealing the wrapping material portion around the item by attaching the second adhesive substrate to the second side of the base film.

11. The method of claim 1, wherein each wrapping material portion includes a second adhesive substrate including a bottom adhesive surface attached to the first side of the base film adjacent to the perforation line and adjacent to the adhesive substrate, a top second adhesive surface facing opposite of the bottom adhesive surface and the top adhesive surface is covered by a second release liner with a top third adhesive surface facing away from the top second adhesive surface and attached to a second side of the base film when on the roll, wherein during the further unrolling step, the second release liner is separated from the second adhesive substrate to expose the second adhesive substrate.

12. The method of claim 11, further comprising the step of sealing the wrapping material portion around the item by attaching the second adhesive substrate to the second side of the base film.

13. The method of claim 11, wherein during the further unrolling step, the second release liner remains adhered to the second side of the base film of the wrapping material portion.

14. A method of wrapping an item, comprising the steps of:
    unrolling a wrapping material portion from a roll of wrapping material portions, the unrolling starting at a leading end of the wrapping material portion and continuing along a length of the portion towards a trailing end of the portion, each wrapping material portion including a base film, a first adhesive substrate including a bottom adhesive surface attached to a first side of the base film of the wrapping material portion adjacent to a perforation line, a top first adhesive surface, facing opposite of the bottom adhesive surface and the top first adhesive surface is covered by a first release liner with a top second adhesive surface facing away from the top first adhesive surface and attached to a second side of the base film of the wrapping material portion when on the roll; and
    further unrolling the wrapping material portion from the roll of wrapping material portions such that the first release liner separates from the first adhesive surface, the first release liner remaining attached to the second side of the base film of the wrapping material portion and the first adhesive surface remaining attached to the first side of the base film of the wrapping material portion.

15. The method of claim 14, wherein, after the further unrolling step, a position of the first release liner on the second side of the base film of the wrapping material portion is closer to the leading end of the wrapping material portion than a position of the first adhesive substrate on the first side of the base film of the wrapping material portion.

16. The method of claim 14, wherein a position of the first adhesive substrate on the first side of the base film of the wrapping material portion is at or adjacent to the trailing end of the base film of the wrapping material portion.

17. The method of claim 16, wherein, except for on the last wrapping material portion on the roll, the trailing end of each wrapping material portion on the roll of wrapping material portions is connected to the leading end of a subsequent wrapping material portion by a perforation line, and each wrapping material portion further including, except for on the last wrapping material portion on the roll, a second adhesive substrate including a bottom adhesive surface attached to the first side of the base film and attached to a first side of the base film of the subsequent wrapping material portion, such that the adhesive substrate overlies the perforation line.

18. The method of claim 17, further comprising the step of sealing the wrapping material portion around the item by attaching the adhesive substrate and the portion of the second adhesive substrate remaining attached to the first side of the base film of the wrapping material portion to the second side of the base film.

19. The method of claim 14, wherein the item is a bale of harvested agricultural material.

* * * * *